(No Model.)

J. RIGBY.
CAR WHEEL.

No. 411,354. Patented Sept. 17, 1889.

Witnesses
Will S. Norton
W. A. Roberts

Inventor
James Rigby
By his Attorney
E. S. Clark

N. PETERS, Photo-Lithographer, Washington, D. C.

UNITED STATES PATENT OFFICE.

JAMES RIGBY, OF MINNEAPOLIS, MINNESOTA.

CAR-WHEEL.

SPECIFICATION forming part of Letters Patent No. 411,354, dated September 17, 1889.

Application filed January 23, 1889. Serial No. 297,241. (No model.)

*To all whom it may concern:*

Be it known that I, JAMES RIGBY, a citizen of the United States, residing at Minneapolis, in the county of Hennepin and State of Minnesota, have invented certain new and useful Improvements in Car-Wheels; and I do hereby declare the following to be a full, clear, and exact description of the invention, such as will enable others skilled in the art to which it appertains to make and use the same.

This invention relates to car-wheels in which the web or body and the tire are made in separate parts and secured together by simple and effective means, made integral with such body and tire, as hereinafter described.

The object of my invention is to provide for interlocking the body and tire and rigidly securing them together by the simplest means, formed integrally with such body and tire and without the use of bolts and nuts or rivets, or a spring-locking ring heretofore proposed. The outer periphery of the body and inner periphery of the tire are formed with certain annular grooves, beads, and flanges, corresponding one to the other, so as to interlock when fitted together, and a continuous annular flange is formed on the tire, which is heated and hammered down over the body after the parts are fitted together, so that they are rigidly held in place and cannot work apart and become loose in ordinary wear.

The construction of my improved wheel is illustrated in the accompanying drawings, in which—

Figure 1:
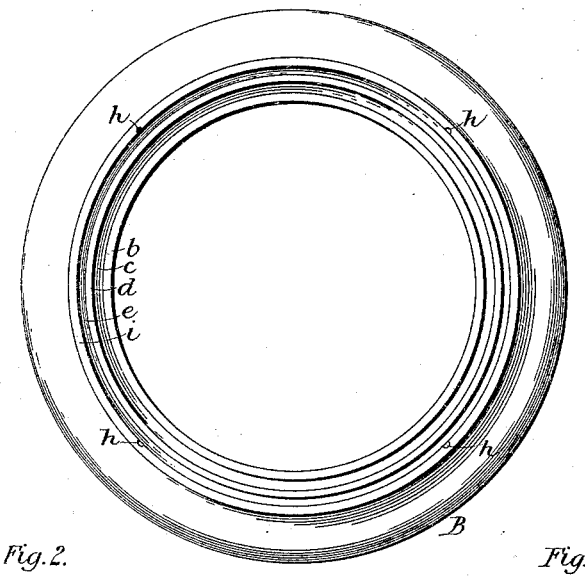
Figure 2:
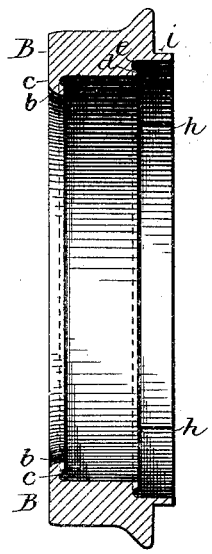
Figure 3:
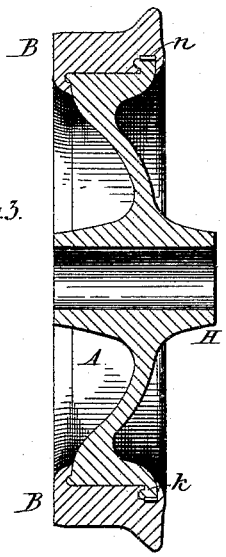
Figure 4:
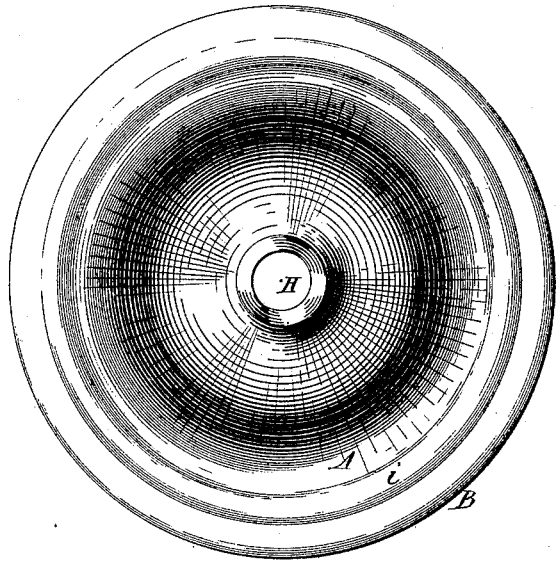
Figure 5:
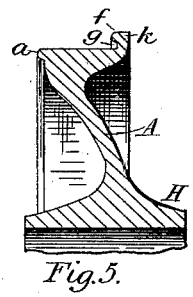

Figure 1 represents the inner face view of the tire, looking down into the annular grooves formed in the ledges. Fig. 2 represents a vertical diametrical section of the tire. Fig. 3 represents a vertical diametrical section of the body and tire fitted together. Fig. 4 represents an inside face view of the completed wheel. Fig. 5 represents a sectional detail of the body.

The body A of the wheel is formed of cast wrought-iron or steel or other suitable metal or alloy, and is provided with a large smooth-faced flange $k$, free from recesses or notches, extending in the direction of the radii from its periphery and at its inner face, and with an annular bead $a$ raised upon its outer face just at the junction of the face and periphery. The body has also the usual hub and axle opening H. After the body is formed in the rough it is preferably placed in a lathe and turned, where, by means of a suitable tool, there is cut on the inside of flange $k$ the annular groove $g$ and bead $f$. The bead $a$ may be cut at the same time and by the same tool into smooth regular form, though it is my purpose to cast or otherwise raise the bead $a$ in the rough condition upon the body before it is put into the lathe.

The tire B is rolled into the proper shape and size in the usual manner, and has formed on its inner periphery the steps or ledges shown in Figs. 1 and 2, and the continuous uncut annular flange $i$, extending from its inner face nearly parallel with the tread of the tire. A flange $b$ projects inward from the inner periphery of the tire at its outer face and forms the inner step or ledge seen in Fig. 1. The outer step or ledge is formed near the inner face of the tire, and flange $i$ projects horizontally outward from such inner face inside of the usual peripheral flange projecting from the tread of the wheel. The tire having been made in the rough condition, it is turned in a lathe, and by means of a suitable tool there is cut in the inside of flange $b$ an annular groove $c$ and in the outer step or ledge the annular groove $e$, forming lip or bead $d$. The flange $i$ is also cut and dressed to the proper thickness. The grooves $c$ and $e$ in the tire and the beads $a$ and $f$ on the body are cut of corresponding shape and dimensions, so that the beads will fit neatly in the grooves and be locked therein when the parts are secured together. When the parts of the body and tire are turned to fit neatly together, the tire is laid upon its outer face, and the body, with its outer face downward, is dropped into place in the tire and forced inward till its beads $a$ and $f$ are snugly seated in grooves $c$ and $e$. Flange $b$ abuts against the outer face of the body, and lip $d$ of the tire fits in groove $g$ of the body. Small holes $h\ h$ are now bored in the joint between the body and tire adjacent to flange $i$, and into these holes are fitted short dowel-pins $n$, which are only long enough for their outer ends to be flush with the face of the body. These pins thus inserted serve to prevent the body and tire from turning one upon the other. The parts can now be secured together, and this is accomplished by first heating flange $i$ by a series of Bunsen or blow-pipe flames to a welding heat and then turning it inward and hammering it down closely all around upon the body. After being well hammered down it may be turned in a lathe for giving it a smoother finish. The interlocking beads and flanges hold the tire and body in close contact at every point in the circumference adjacent to both the outer and inner faces, so that the tire cannot expand away from the body, and the abutting flange $b$ and turned-down flange $i$ securely fasten them together, so that they cannot work apart.

Since no bolt-holes are used, the parts are left stronger and more durable, and by dispensing with bolts and rivets the construction is much simplified and the cost reduced.

There are no parts about my wheel to wear, shake loose, and rattle. It is every way compact and neat in appearance and is very durable and satisfactory in use.

Having described my invention, what I claim, and desire to secure by Letters Patent, is—

1. In combination with a car-wheel body, a tire formed with annular ledges upon its inner periphery and near its outer and inner faces for receiving the body, and having a continuous or uncut annular flange projecting from its inner face and adapted to be hammered down over the body for holding it in place, as described.

2. In a car-wheel, the tire formed with annular steps or ledges on its inner periphery and having grooves cut in such ledges, and with a continuous or uncut annular flange projecting from its face, in combination with the body having a smooth-faced flange $k$ and provided with annular projecting beads $a\,f$, adapted to fit in the grooves of the tire and interlock, said flange of the tire being adapted to be hammered down all around over the body to hold it in place, substantially as described.

In testimony whereof I affix my signature in presence of two witnesses.

JAMES RIGBY.

Witnesses:
E. B. CLARK,
SCHUYLER DURYEE.